United States Patent
Togo et al.

(10) Patent No.: US 10,666,502 B2
(45) Date of Patent: May 26, 2020

(54) COMMUNICATION APPARATUS, COMMUNICATION SYSTEM, COMMUNICATION METHOD, AND NON-TRANSITORY COMPUTER READABLE MEDIUM

(71) Applicants: NEC Corporation, Tokyo (JP); SoftBank Corp., Tokyo (JP)

(72) Inventors: Shigetaka Togo, Tokyo (JP); Ryo Nishibori, Tokyo (JP)

(73) Assignees: NEC CORPORATION, Minato-ku, Tokyo (JP); SoftBank Corp., Minato-ku, Tokyo (JP)

( * ) Notice: Subject to any disclaimer, the term of this patent is extended or adjusted under 35 U.S.C. 154(b) by 0 days.

(21) Appl. No.: 16/091,580

(22) PCT Filed: Apr. 6, 2017

(86) PCT No.: PCT/JP2017/014349
§ 371 (c)(1),
(2) Date: Oct. 5, 2018

(87) PCT Pub. No.: WO2017/175826
PCT Pub. Date: Oct. 12, 2017

(65) Prior Publication Data
US 2019/0165994 A1 May 30, 2019

(30) Foreign Application Priority Data
Apr. 8, 2016 (JP) .................................. 2016-077788

(51) Int. Cl.
*H04L 12/24* (2006.01)
*H04L 29/04* (2006.01)
(Continued)

(52) U.S. Cl.
CPC ...... *H04L 41/0668* (2013.01); *H04L 12/1877* (2013.01); *H04L 29/04* (2013.01);
(Continued)

(58) Field of Classification Search
CPC .................................................. H04L 41/0668
(Continued)

(56) References Cited

U.S. PATENT DOCUMENTS

2002/0107980 A1* 8/2002 Kawaguchi ........... G06F 13/385
709/238
2008/0279181 A1 11/2008 Shake et al.
(Continued)

FOREIGN PATENT DOCUMENTS

JP 2003-143191 A 5/2003
JP 2006-174406 A 6/2006
(Continued)

OTHER PUBLICATIONS

Communication dated Feb. 27, 2019, issued by the European Patent Office in counterpart European Application No. 17779204.1.
(Continued)

*Primary Examiner* — Peter G Solinsky
(74) *Attorney, Agent, or Firm* — Sughrue Mion, PLLC

(57) ABSTRACT

A communication apparatus (10) according to the present disclosure includes a transmitting unit (11) configured to transmit a packet to a communication apparatus (20) at the other end through a communication line (31), a transmitting unit (12) configured to transmit a packet to the communication apparatus (20) at the other end through a communication line (32), a packet generation unit (13) configured to generate a plurality of packets by duplicating a packet, a monitoring unit (15) configured to monitor communication states of the communication lines (31, 32), and a control unit (14) configured to determine to transmit two or more of the
(Continued)

plurality of duplicated packets to the communication apparatus (20) at the other end by using at least one of the communication lines (31, 32) according to the communication states.

12 Claims, 12 Drawing Sheets

(51) Int. Cl.
*H04L 29/14* (2006.01)
*H04L 12/707* (2013.01)
*H04L 12/18* (2006.01)
*H04L 12/26* (2006.01)
*H04L 12/939* (2013.01)

(52) U.S. Cl.
CPC .......... *H04L 43/0811* (2013.01); *H04L 45/24* (2013.01); *H04L 49/552* (2013.01); *H04L 69/40* (2013.01)

(58) Field of Classification Search
USPC ........................................................ 370/228
See application file for complete search history.

(56) References Cited

U.S. PATENT DOCUMENTS

| | | | | |
|---|---|---|---|---|
| 2008/0285437 A1* | 11/2008 | Polland | ................ | H04L 49/351 370/219 |
| 2009/0232135 A1* | 9/2009 | Terui | ................... | H04L 1/1838 370/389 |
| 2009/0276672 A1* | 11/2009 | Lee | ................... | H04B 7/0671 714/749 |
| 2013/0322468 A1* | 12/2013 | Koo | ................... | H04L 69/22 370/474 |
| 2014/0105033 A1* | 4/2014 | Vasseur | ................ | H04L 45/24 370/248 |

FOREIGN PATENT DOCUMENTS

| | | |
|---|---|---|
| JP | 2008-172656 A | 7/2008 |
| JP | 2008-227623 A | 9/2008 |
| JP | 2010-028572 A | 2/2010 |

OTHER PUBLICATIONS

International Search Report of PCT/JP2017/014349 dated Jul. 4, 2017.

* cited by examiner

COMMUNICATION APPARATUS, COMMUNICATION SYSTEM, COMMUNICATION METHOD, AND NON-TRANSITORY COMPUTER READABLE MEDIUM

CROSS REFERENCE TO RELATED APPLICATIONS

This application is a National Stage of International Application No. PCT/JP2017/014349 filed Apr. 6, 2017, claiming priority based on Japanese Patent Application No. 2016-077788 filed Apr. 8, 2016, the disclosure of which is incorporated herein in its entirety by reference.

TECHNICAL FIELD

The present disclosure relates to a communication apparatus, a communication system, a communication method, and a program, and in particular relates to a communication apparatus, a communication system, a communication method, and a program using a plurality of communication lines.

BACKGROUND ART

It has been desired that a communication system that transmits packets be highly reliable such as having a low packet loss rate. Further, in recent years, even when a communication line used between communication apparatuses is a best-effort line, high reliability may be required.

Patent Literature 1 describes a configuration example of a communication network that achieves high reliability. Specifically, in the communication network, a packet transfer apparatus is provided in each of a packet transmitting side and a packet receiving side. Two or more independent paths are established between the packet transfer apparatuses. The packet transfer apparatus on the transmitting side duplicates a packet and thereby generates two or more packets. Further, the packet transfer apparatus on the transmitting side outputs the two or more copied packets to independent paths. Therefore, identical packets are transmitted in two or more independent paths. As a result, even if a packet loss occurs in one of the paths, the packet is transmitted through the other path. Therefore, it is possible to improve a probability that the packet reaches the packet transfer apparatus on the receiving side.

CITATION LIST

Patent Literature

Patent Literature 1: Japanese Unexamined Patent Application Publication No. 2006-174406

SUMMARY OF INVENTION

Technical Problem

However, in the communication network disclosed in Patent Literature 1, when a failure occurs in one of the two independent paths, a problem that reliability or quality of the communication network deteriorates occurs. Specifically, when a failure occurs in one of the paths, only one path is used between the packet transfer apparatuses. However, if communication quality of the path used for packet transmission deteriorates, the packet transfer apparatus on the transmitting side cannot select another path. As a result, since the packet transfer apparatus on the transmitting side uses the path having the deteriorated communication quality, the packet loss rate increases.

An object of the present disclosure is to provide a communication apparatus, a communication system, a communication method, and a program capable of improving reliability and communication quality of a communication network.

Solution to Problem

A communication apparatus according to a first aspect of the present disclosure includes: a first transmitting unit configured to transmit a packet to a communication apparatus at the other end through a first communication line; a second transmitting unit configured to transmit a packet to the communication apparatus at the other end through a second communication line; a packet generation unit configured to generate a plurality of packets by duplicating a packet; a monitoring unit configured to monitor communication states of the first and second communication lines; and a control unit configured to determine to transmit two or more of the plurality of duplicated packets to the communication apparatus at the other end by using at least one of the first and second communication lines according to the communication states.

A communication system according to a second aspect of the present disclosure includes: a transmitting apparatus configured to transmit two or more of a plurality of duplicated packets to a receiving apparatus by using at least one of first and second communication lines according to communication states of the first and second communication lines; and the receiving apparatus configured to delete a duplicate packet when the receiving apparatus receives the plurality of duplicated packets through at least one of the first and second communication lines.

A communication method according to a third aspect of the present disclosure includes: monitoring communication states of first and second communication lines; generating a plurality of packets by duplicating a packet; and transmitting two or more of a plurality of duplicated packets to a communication apparatus at the other end through the first and second communication lines by using at least one of the first and second communication lines according to the communication states.

A program according to a fourth aspect of the present disclosure causes a computer to perform: monitoring communication states of first and second communication lines; generating a plurality of packets by duplicating a packet; and transmitting two or more of a plurality of duplicated packets to a communication apparatus at the other end through the first and second communication lines by using at least one of the first and second communication lines according to the communication states.

Advantageous Effects of Invention

According to the present disclosure, it is possible to provide a communication apparatus, a communication system, a communication method, and a program capable of improving reliability and communication quality of a communication network.

DESCRIPTION OF EMBODIMENTS

First Embodiment

Figure 1:
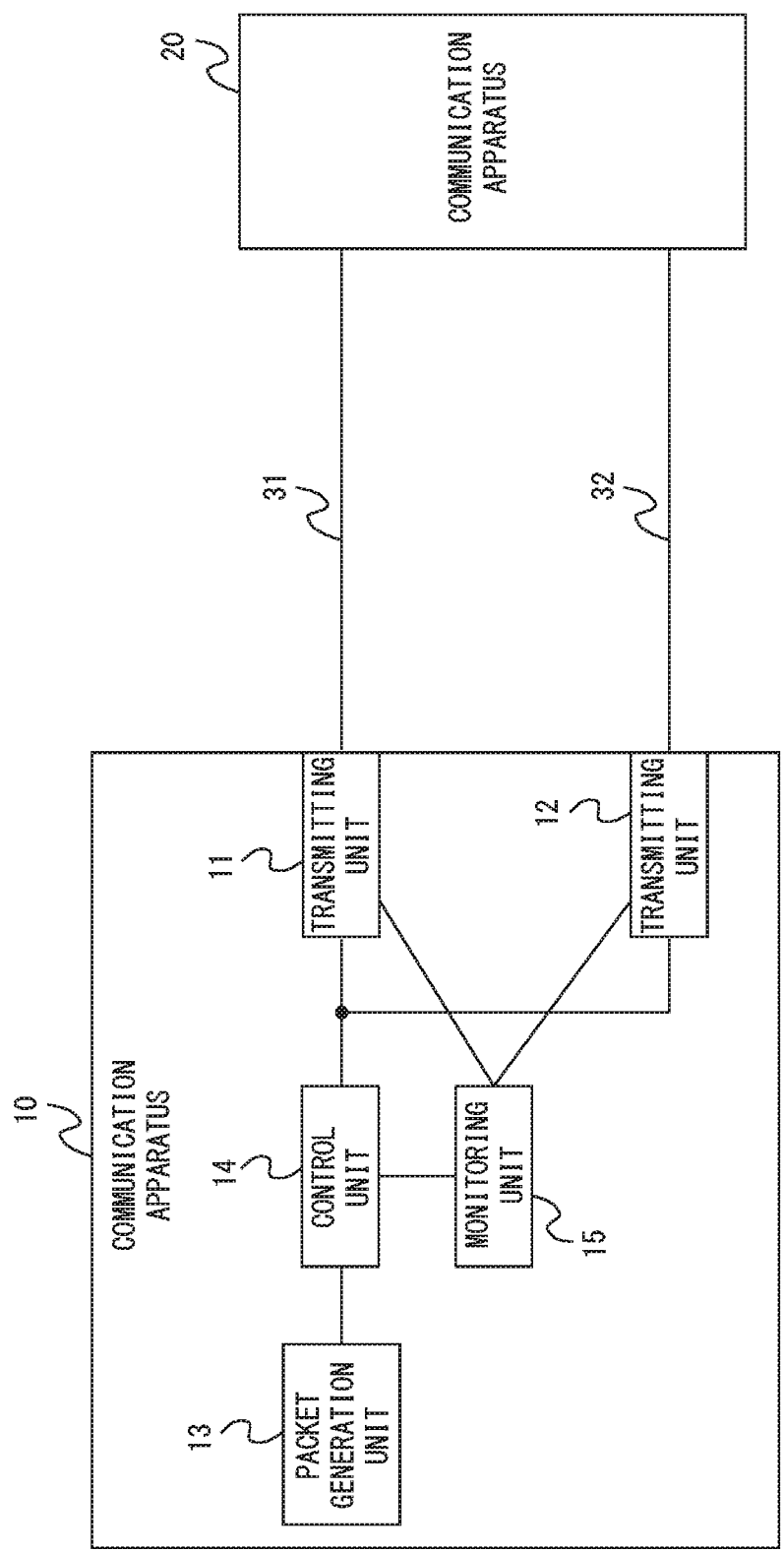
FIG. 1 is a configuration diagram of a communication system according to a first embodiment.

Embodiments according to the present disclosure will be described hereinafter with reference to the drawings. A configuration example of a communication system according to a first embodiment of the present disclosure is described with reference to FIG. 1. A communication system shown in FIG. 1 includes a communication apparatus 10 and a communication apparatus 20. The communication system shown in FIG. 1 is described on the assumption that, in general, the communication apparatus 10 is an apparatus that transmits a packet and the communication apparatus 20 is an apparatus that receives the packet.

Each of the communication apparatuses 10 and 20 may be a computer apparatus that operates by having a processor execute a program stored in a memory. Each of the communication apparatuses 10 and 20 may be a relay apparatus or the like for relaying data. Each of the communication apparatuses 10 and 20 may be, for example, a router apparatus or the like.

A communication line 31 and a communication line 32 are established between the communication apparatuses 10 and 20. Each of the communication lines 31 and 32 may be a communication line in which a wireless communication line is used as a part of its communication path, a communication line formed solely by a wireless communication line, or a communication line formed solely by a wired communication line.

Next, a configuration example of the communication apparatus 10 is described. The communication apparatus 10 includes a transmitting unit 11, a transmitting unit 12, a packet generation unit 13, a control unit 14, and a monitoring unit 15. Components constituting the communication apparatus 10, such as the transmitting unit 11, the transmitting unit 12, the packet generation unit 13, the control unit 14, and the monitoring unit 15, may be software or modules by which processes are performed by having a processor execute a program stored in a memory. Alternatively, the components constituting the communication apparatus 10 may be hardware such as a circuit or a chip.

The transmitting unit 11 transmits a packet to the communication apparatus 20 at the other end through the communication line 31. The transmitting unit 12 transmits a packet to the communication apparatus 20 at the other end through the communication line 32.

The packet generation unit 13 duplicates one packet and thereby generates a plurality of packets. The monitoring unit 15 monitors communication states of the communication lines 31 and 32. The communication state may be, for example, a communication state or communication quality. In other words, the monitoring unit 15 may monitor whether or not communication using the communication lines 31 and 32 can be performed, or whether or not communication quality of the communication lines 31 and 32 has deteriorated.

The control unit 14 determines to transmit two or more of a plurality of packets generated by the packet generation unit 13 to the communication apparatus 20 at the other end by using at least one of the communication lines 31 and 32.

For example, the control unit 14 may determine to transmit two or more of the plurality of packets to the communication apparatus 20 by using the communication lines 31 and 32. Alternatively, the control unit 14 may determine to transmit two or more of the plurality of packets to the communication apparatus 20 by using only the communication line 31. Alternatively, the control unit 14 may determine to transmit all the duplicated packets to the communication apparatus 20 by using only the communication line 31.

As described above, when the communication apparatus 10 uses two communication lines, it can output the same packet to each of the two communication lines. In this way, it is possible to improve a probability that the packet reaches the communication apparatus 20. Further, even when the communication apparatus 10 uses only one of the communication lines 31 and 32, it can output two or more packets to the used communication line. In this way, it is also possible to improve the probability that the packet reaches the communication apparatus 20.

As a result, by using the communication apparatus 10, it is possible to improve the reliability of the communication network including the communication apparatuses 10 and 20 and its communication quality.

Second Embodiment

Figure 2:
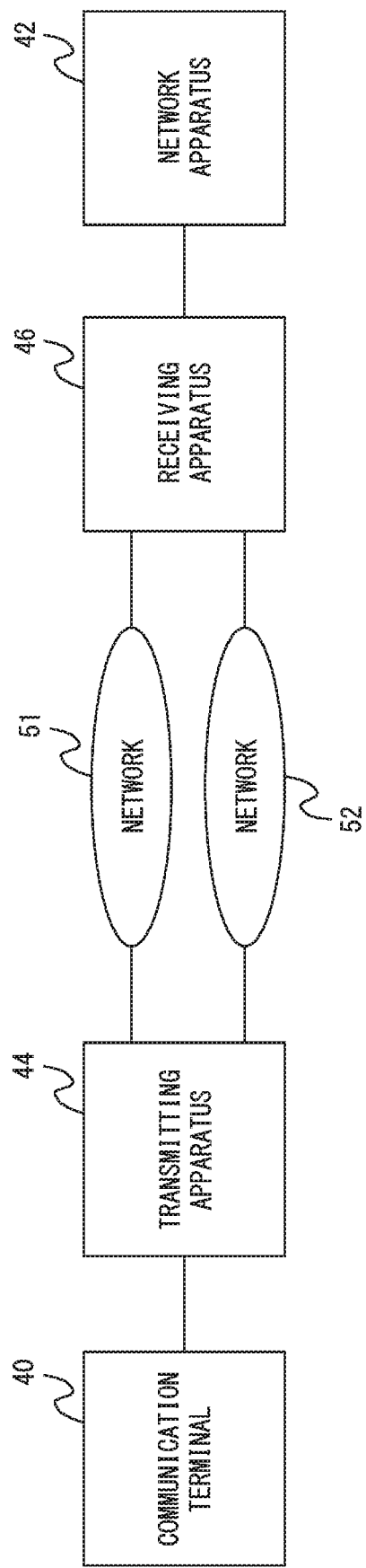
FIG. 2 is a configuration diagram of a communication system according to a second embodiment.

Next, a configuration example of a communication system according to a second embodiment of the present disclosure is described with reference to FIG. 2. A communication system shown in FIG. 2 includes a communication terminal 40, a network apparatus 42, a transmitting apparatus 44, a receiving apparatus 46, a network 51, and a network 52.

The transmitting apparatus 44 corresponds to the communication apparatus 10 in FIG. 1. The receiving apparatus 46 corresponds to the communication apparatus 20 in FIG. 1. The transmitting apparatus 44 duplicates a packet transmitted from the communication terminal 40 and thereby generates a plurality of packets. The transmitting apparatus 44 transmits the generated plurality of packets to the receiving apparatus 46. Further, the receiving apparatus 46 transmits the packet transmitted from the transmitting apparatus 44 to the network apparatus 42.

The communication terminal 40 transmits a packet to the network apparatus 42 through the transmitting apparatus 44, at least one of the networks 51 and 52, and the receiving apparatus 46. The network apparatus 42 may be a node apparatus managed by a telecommunications carrier. The node apparatus is an apparatus that is disposed in a network managed by the telecommunications carrier and relays packets.

When the transmitting apparatus 44 connects to the networks 51 and 52, the transmitting apparatus 44 may connect to them through a wireless communication line. Alternatively, the transmitting apparatus 44 may connect to one of the networks 51 and 52 through a wireless communication line and connect to the other network through a wired communication line. Alternatively, when the transmitting apparatus 44 connects to the networks 51 and 52, the transmitting apparatus 44 may connect to them through a wired communication line.

The wireless communication line may be, for example, mobile communication or wireless LAN (Local Area Network) communication. The wireless communication line may also be referred to as a mobile network line. The mobile communication may be, for example, a wireless communication method defined as 3G in 3GPP (3rd Generation Partnership Project) or a wireless communication method defined as LTE (Long Term Evolution) in the 3GPP.

The wired communication line may be, for example, an optical communication line or a communication line using an Ethernet (Registered Trademark). Further, the network 51 may be operated by a telecommunications carrier different from a telecommunications carrier operating the network 52. When the mobile communication is used, the transmitting apparatus 44 performs wireless communication with a base station disposed in the network 51 or 52. In the case where the networks 51 and 52 are operated by different telecommunications carriers, the transmitting apparatus 44 communicates with a base station disposed in the network 51 and communicates with a base station disposed in the network 52. When the wireless LAN communication is used instead of the mobile communication, the transmitting apparatus 44 communicates with an access point instead of the base station.

Further, when the transmitting apparatus 44 connects to the networks 51 and 52 by using wireless communication lines, it may use different frequencies for communication with the network 51 and for communication with the network 52, respectively.

By making the networks 51 and 52 independent of each other, i.e., by using different types of networks as the networks 51 and 52 as described above, the transmitting apparatus 44 can transmit packets to the receiving apparatus 46 by using different paths. As a result, it is possible to avoid a situation in which the networks 51 and 52 become unavailable at the same time.

Figure 3:
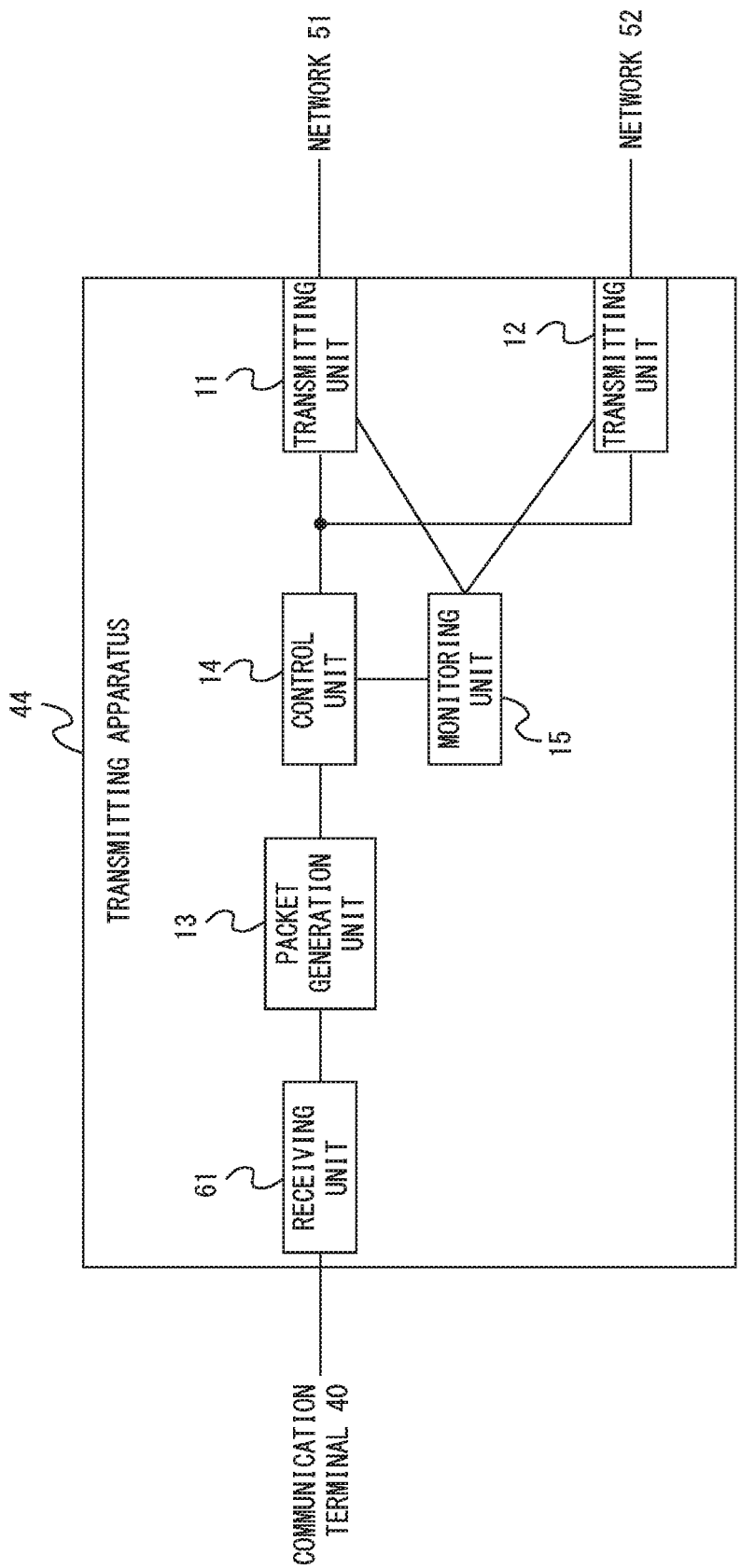
FIG. 3 is a configuration diagram of a transmitting apparatus according to the second embodiment.

Next, a configuration example of the transmitting apparatus 44 according to the second embodiment of the present disclosure is described with reference to FIG. 3. The transmitting apparatus 44 has a configuration that is obtained by adding a receiving unit 61 in the communication apparatus 10 shown in FIG. 1. The configuration of the transmitting apparatus 44 other than the receiving unit 61 is similar to the configuration of the communication apparatus 10 and therefore a detailed description thereof is omitted.

The receiving unit 61 receives a packet transmitted from the communication terminal 40. The receiving unit 61 outputs the received packet to the packet generation unit 13. The receiving unit 61 connects to the communication terminal 40 through a wireless communication line or a wired communication line. As the wireless communication line, for example, wireless LAN communication may be used or short-range wireless communication such as Bluetooth (Registered Trademark) may be used. The wired communication line may be, for example, an optical communication line or a communication line using an Ethernet (Registered Trademark).

The packet generation unit 13 receives the packet output from the receiving unit 61. The packet generation unit 13 duplicates the received packet and thereby generates a plurality of packets. The packets generated by duplicating the packet output from the receiving unit 61 may also be referred to as redundant packets.

Figure 4:
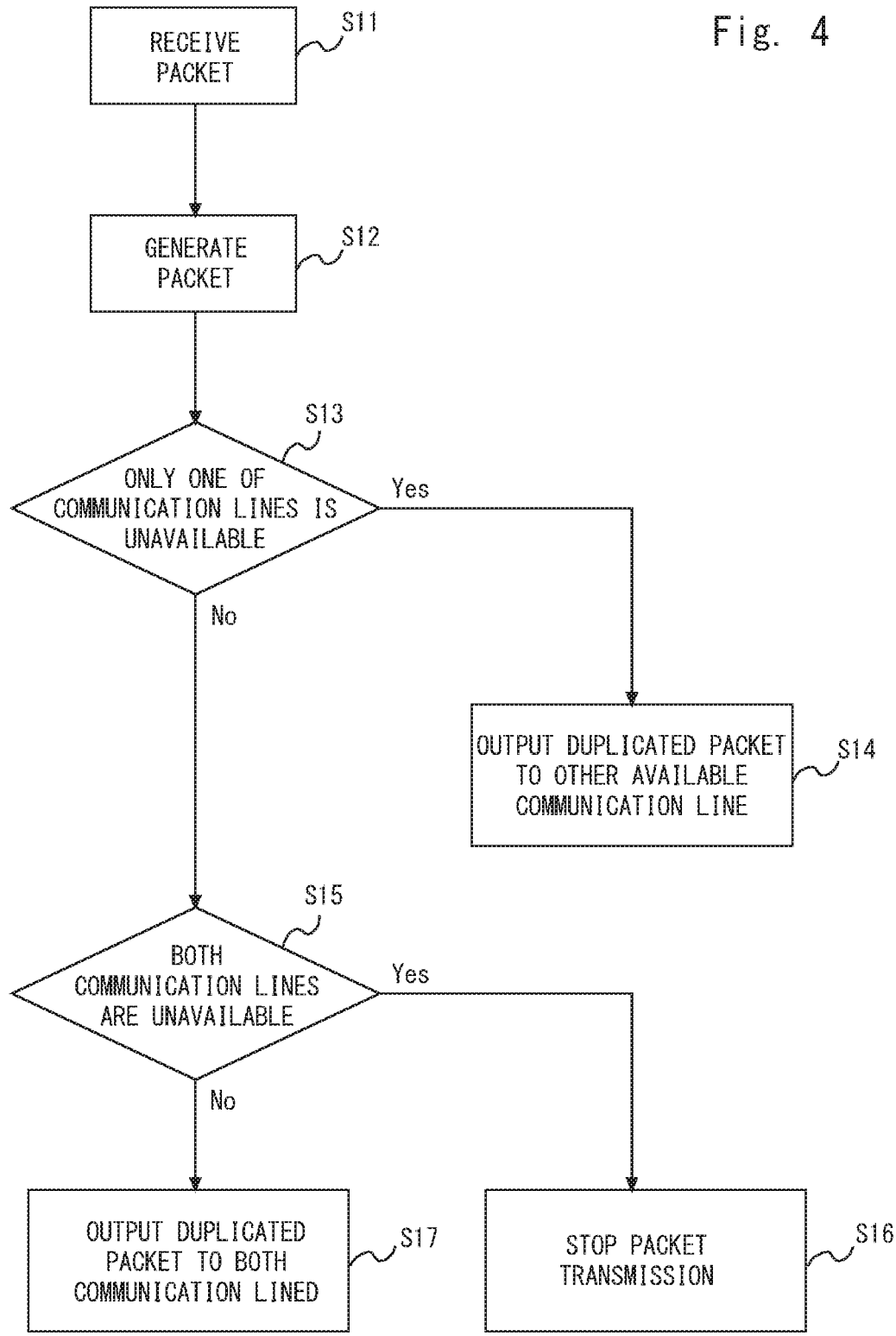
FIG. 4 shows a flow of packet transmitting processes in the transmitting apparatus according to the second embodiment.

Next, a flow of packet transmitting processes performed in the transmitting apparatus 44 according to the second embodiment of the present disclosure is described with reference to FIG. 4. Firstly, the receiving unit 61 receives a packet transmitted from the communication terminal 40 (S11).

Next, the packet generation unit 13 duplicates the packet that the receiving unit 61 has received and thereby generates a plurality of packets (S12). For example, the packet generation unit 13 may generate the same number of packets as the number of transmitting units included in the transmitting apparatus 44. Specifically, the transmitting apparatus 44 includes the transmitting units 11 and 12. Therefore, the packet generation unit 13 may make one copy of the packet transmitted from the communication terminal 40 and thereby generate two packets in total. Alternatively, the packet generation unit 13 may generate a larger number of packets than the number of transmitting units included in the transmitting apparatus 44.

Next, the monitoring unit 15 checks communication related to a communication line used by the transmitting unit 11 and a communication line used by transmitting unit 12. The monitoring unit 15 determines whether or not only one of the communication lines used by the transmitting units 11 and 12 is unavailable (S13). For example, the monitoring unit 15 transmits health-check request messages to the receiving apparatus 46 through the transmitting units 11 and 12. When the monitoring unit 15 receives a health-check response message within a specified time period, it determines that the communication line to which the health-check request message has been output can be used. Further, when the monitoring unit 15 does not receive the health-check response message within the specified time, it determines that the communication line to which the health-check request message has been output cannot be used. Alternatively, the monitoring unit 15 may determine that the communication line cannot be used when it has repeatedly transmitted a health-check response message a predetermined number of times but has not been able to receive a health-check response message to any of the health-check request messages.

When it is determined that only one of the communication lines is unavailable in the monitoring unit 15, the control unit 14 outputs the plurality of packets generated in the step S12 to the other available communication line (S14). That is, when the communication line used by the transmitting unit 11 is unavailable, the control unit 14 outputs the packet transmitted from the communication terminal 40 and the redundant packets to the receiving apparatus 46 through the transmitting unit 12.

When the monitoring unit 15 determines that only one of the communication lines is not unavailable, it determines whether or not both of the communication lines are unavailable (S15). When it is determined that both of the communication lines are unavailable in the monitoring unit 15, the control unit 14 stops the packet transmission (S16). When it is determined that both of the communication lines are not unavailable in the monitoring unit 15, i.e., when it is determined that both of the communication lines are available, the control unit 14 outputs the generated packets to both of the communication lines (S17). For example, when one redundant packet is generated, i.e., two packets are generated in total in the step S12, the control unit 14 outputs one of the packets to each of the transmitting units 11 and 12. For example, the control unit 14 may output packets to the transmitting units 11 and 12 at substantially the same timing. Alternatively, the control unit 14 may first output a packet to the transmitting unit 11 and then output another packet to the transmitting unit 12 after a certain time period has elapsed.

Alternatively, when three or more packets are generated in the step S12, the control unit 14 may distribute the packets in the step S17 as described below. For example, it is assumed that the communication line used by the transmitting unit 11 is a wireless communication line and the communication line used by the transmitting unit 12 is a wired communication line. In general, communication quality of a wireless communication line is often lower than that of a wired communication line. Therefore, the control unit 14 may output a larger number of packets to the wireless communication line than the number of packets output to the wired communication line.

Alternatively, it is assumed that each of the transmitting units 11 and 12 performs mobile communication in which an upper limit for an amount of data communication is specified. In this case, the control unit 14 may output a larger number of packets to a transmitting unit in which a difference between the upper limit value and the current communication amount is larger.

Figure 5:
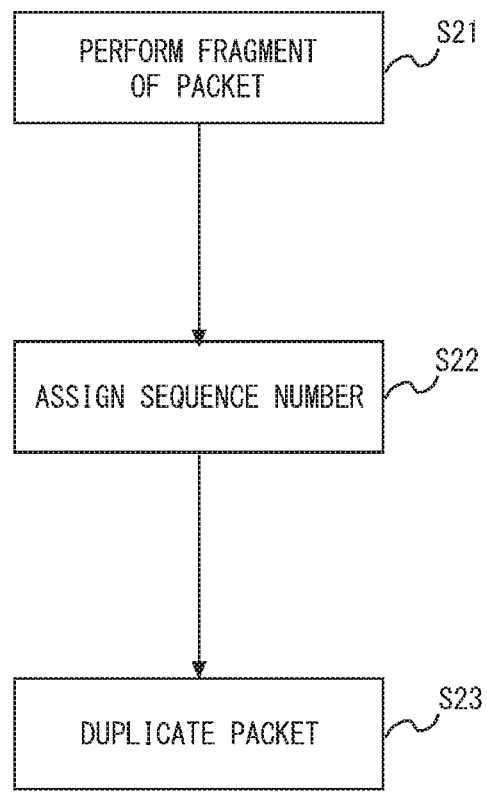
FIG. 5 shows a flow of processes related to packet generating processes according to the second embodiment.

Next, a detailed process flow related to the packet generation process performed in the step S12 is described with reference to FIG. 5. In FIG. 5, it is assumed that a data size of a packet received by the receiving unit 61 is larger than a MTU (Maximum Transmission Unit).

Firstly, the packet generation unit 13 performs a fragment function (S21). Specifically, the packet generation unit 13 divides the packet received by the receiving unit 61 into a plurality of data pieces so that their data sizes become equal to or smaller than the MTU.

Next, the packet generation unit 13 adds headers including sequence numbers to the divided data (S22). The sequence number is, for example, a number indicating an order of messages. The header including the sequence number may be an IP (Internet Protocol) header or a header used in a protocol different from the IP header. Next, the packet generation unit 13 duplicates the packet generated in the step S22 (S23). For example, the packet generation unit 13 may duplicate the packet so that the number of packets becomes equal to or greater than the number of transmitting units included in the transmitting apparatus 44.

Note that when the data size of the packet received by the receiver 61 is smaller than the MTU, the process in the step S21 is skipped.

Figure 6:
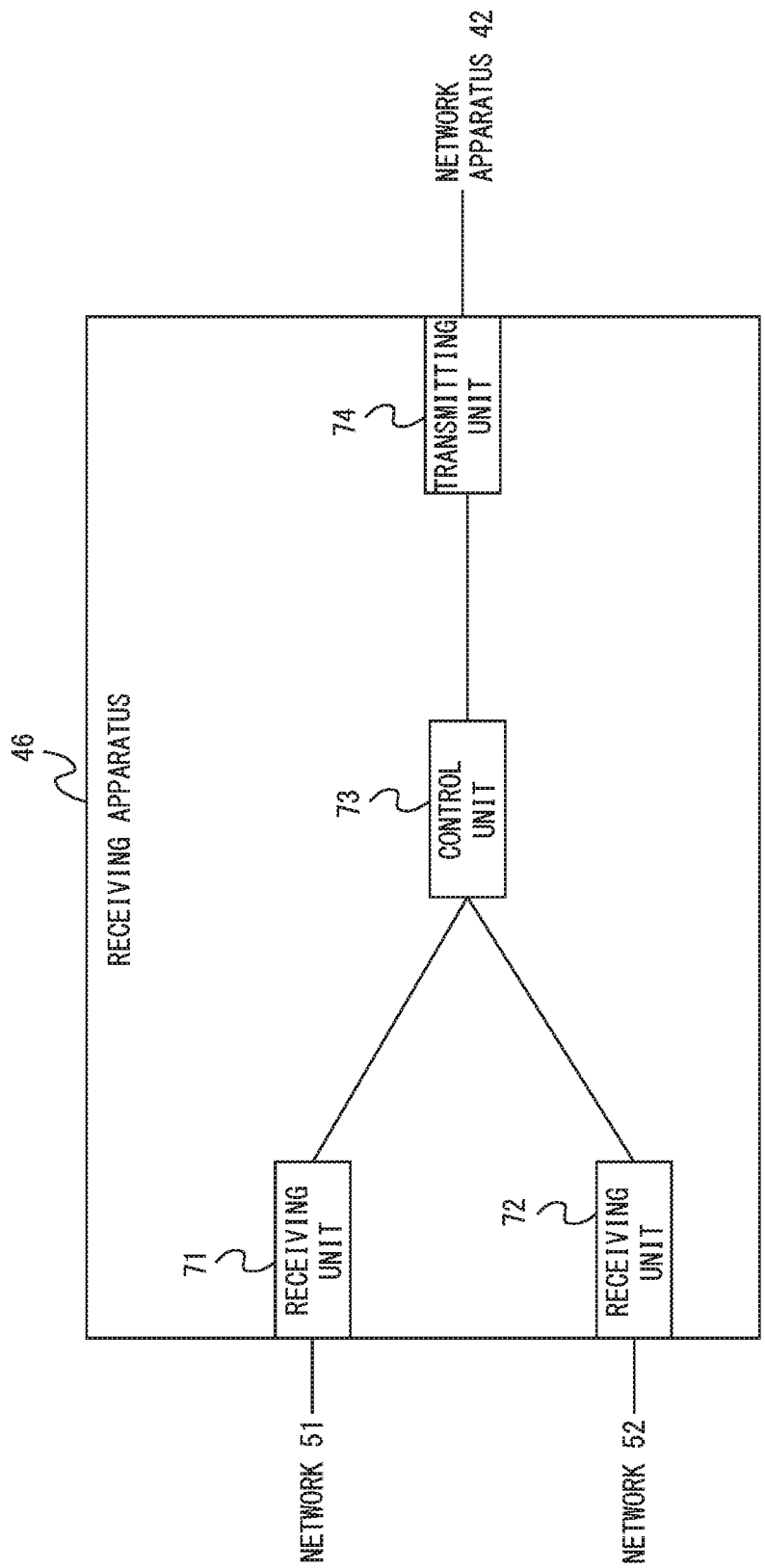
FIG. 6 is a configuration diagram of a receiving apparatus according to the second embodiment.

Next, a configuration example of the receiving apparatus 46 according to the second embodiment of the present disclosure is described with reference to FIG. 6. The receiving apparatus 46 includes a receiving unit 71, a receiving unit 72, a control unit 73, and a transmitting unit 74. Components constituting the receiving apparatus 46, such as the receiving unit 71, the receiving unit 72, the control unit 73, and the transmitting unit 74, may be software or modules by which processes are performed by having a processor execute a program stored in a memory. Alternatively, the components constituting the receiving apparatus 46 may be hardware such as a circuit or a chip.

The receiving unit 71 receives the packet transmitted from the transmitting unit 11 of the transmitting apparatus 44 through the network 51. The receiving unit 71 outputs the received packet to the control unit 73. The receiving unit 72 receives the packet transmitted from the transmitting unit 12 of the transmitting apparatus 44 through the network 52. The receiving unit 72 outputs the received packet to the control unit 73.

The control unit 73 outputs the packet received from the receiving units 71 and 72 to the transmitting unit 74. Further, the control unit 73 deletes duplicate packets. For example, when the control unit 73 receives a packet to which the same sequence number as that of a packet that has already been output to the transmitting unit 74 is assigned from the receiving unit 71 or 72, the control unit 73 may delete the received packet.

Figure 7:
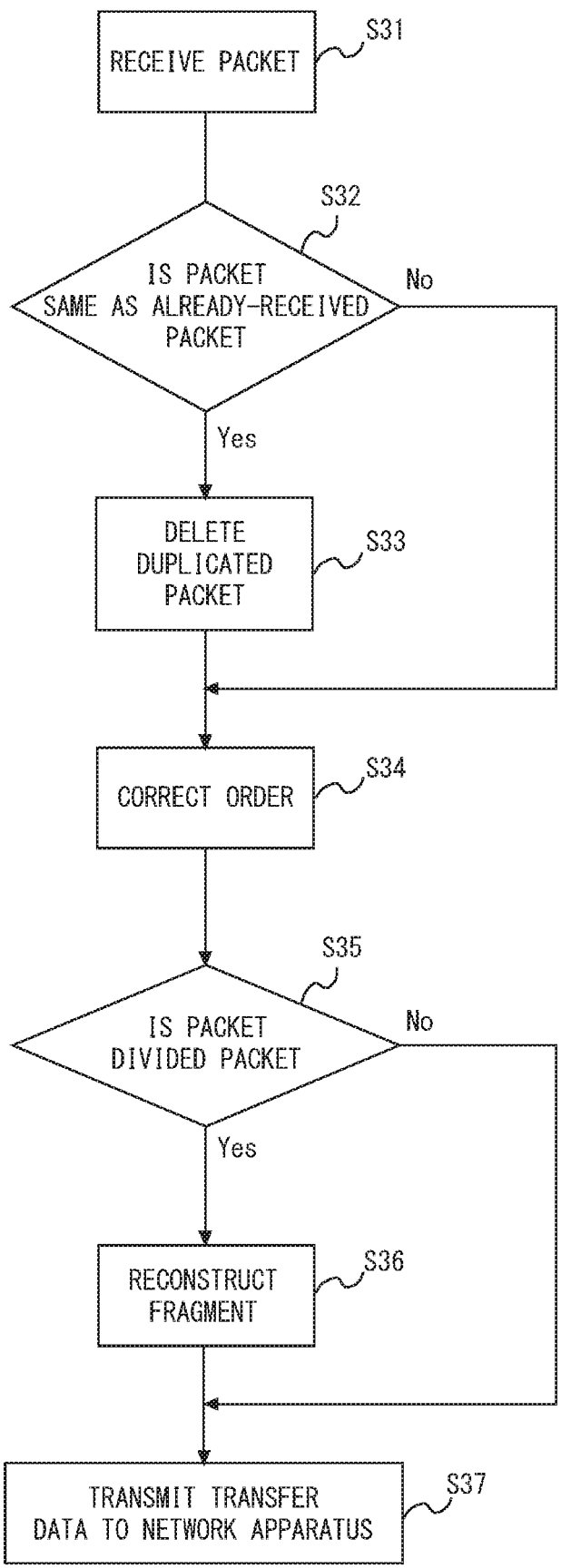
FIG. 7 shows a flow of packet receiving processes in the receiving apparatus according to the second embodiment.

Next, a flow of packet receiving processes performed in the receiving apparatus 46 according to the second embodiment of the present disclosure is described with reference to FIG. 7. Firstly, the receiving units 71 and 72 receive packets transmitted from the transmitting apparatus 44 (S31). Next, the control unit 73 determines whether or not the packet received from the receiving units 71 and 72 is the same as a packet that the control unit 73 received in the past (S32). In other words, the control unit 73 determines whether or not the packet received from the receiving units 71 and 72 is the same as a packet that has already been output to the transmitting unit 74. For example, when the packet received from the receiving units 71 and 72 has the same sequence number as that of a packet that has already been output to the transmitting unit 74, the control unit 73 determines that the packet received from the receiving units 71 and 72 is the same as the packet that was received in the past.

Next, when the control unit 73 determines that the packet received from the receiving units 71 and 72 is the same as the packet that was received in the past, the control unit 73 deletes the received packet (S33).

When the control unit 73 determines that no duplicate packet exists in the step S32 or when it has deleted the duplicate packet in the step S33, the control unit 73 corrects the order of packets (S34). The control unit 73 performs processes in a step S35 and subsequent steps in the order of the sequence number. Here, it is assumed that the control unit 73 has received a packet having a sequence number that is larger than the preceding sequence number by two or larger, rather than receiving a packet having a sequence number larger than the preceding sequence number by one. In this case, the control unit 73 temporarily stores the received packet in a buffer or the like. When the control unit 73 receives a packet having a sequence number that is larger than the sequence number of the packet that has already been output to the transmitting unit 74 by one, the control unit 73 performs processes in the step S35 and subsequent steps for the received packet. Further, the control unit 73 performs the processes in the step S35 and the subsequent steps for the packet(s) stored in the buffer in the order of the sequence number.

Next, the control unit 73 determines whether or not the packet, whose order has been corrected, is a packet that has been divided by fragment (S35). The control unit 73 may check the header of the packet. Then, when a flag indicating that fragment has been performed is set in the header, the control unit 73 may determine that the packet is a packet that has been divided by fragment.

When the control unit 73 determines that the packet, whose order has been corrected, is not a packet that has been divided by fragment, the control unit 73 transmits that packet to the network apparatus 42 through the transmitting unit 74 (S37).

When the control unit 73 determines that the packet, whose order has been corrected, is a packet that has been divided by fragment, the control unit 73 reconstructs the packet (S36). Next, the control unit 73 transmits the reconstructed packet to the network apparatus 42 through the transmitting unit 74 (S37).

As described above, by using the communication system according to the second embodiment of the present disclosure, the transmitting apparatus 44 can transmit a plurality of packets to the receiving apparatus 46 through two communication lines. In this way, it is possible to increase the probability that the packet reaches the receiving apparatus 46. Further, when one of the communication lines is unavailable, it is possible to output a plurality of packets including redundant packets to the other communication line. In this way, compared to the case in which only one packet is output to one communication line, it is possible to increase the probability that the packet reaches the receiving apparatus 46 by outputting a plurality of packets including redundant packets to one communication line.

Further, when the receiving apparatus 46 receives a plurality of packets including redundant packets, the receiving apparatus 46 deletes a duplicate packet(s). By doing so, the receiving apparatus 46 can reduce the number of packets whose order is corrected. As a result, the receiving apparatus 46 can reduce a processing load for correcting the order of packets.

Third Embodiment

Figure 8:
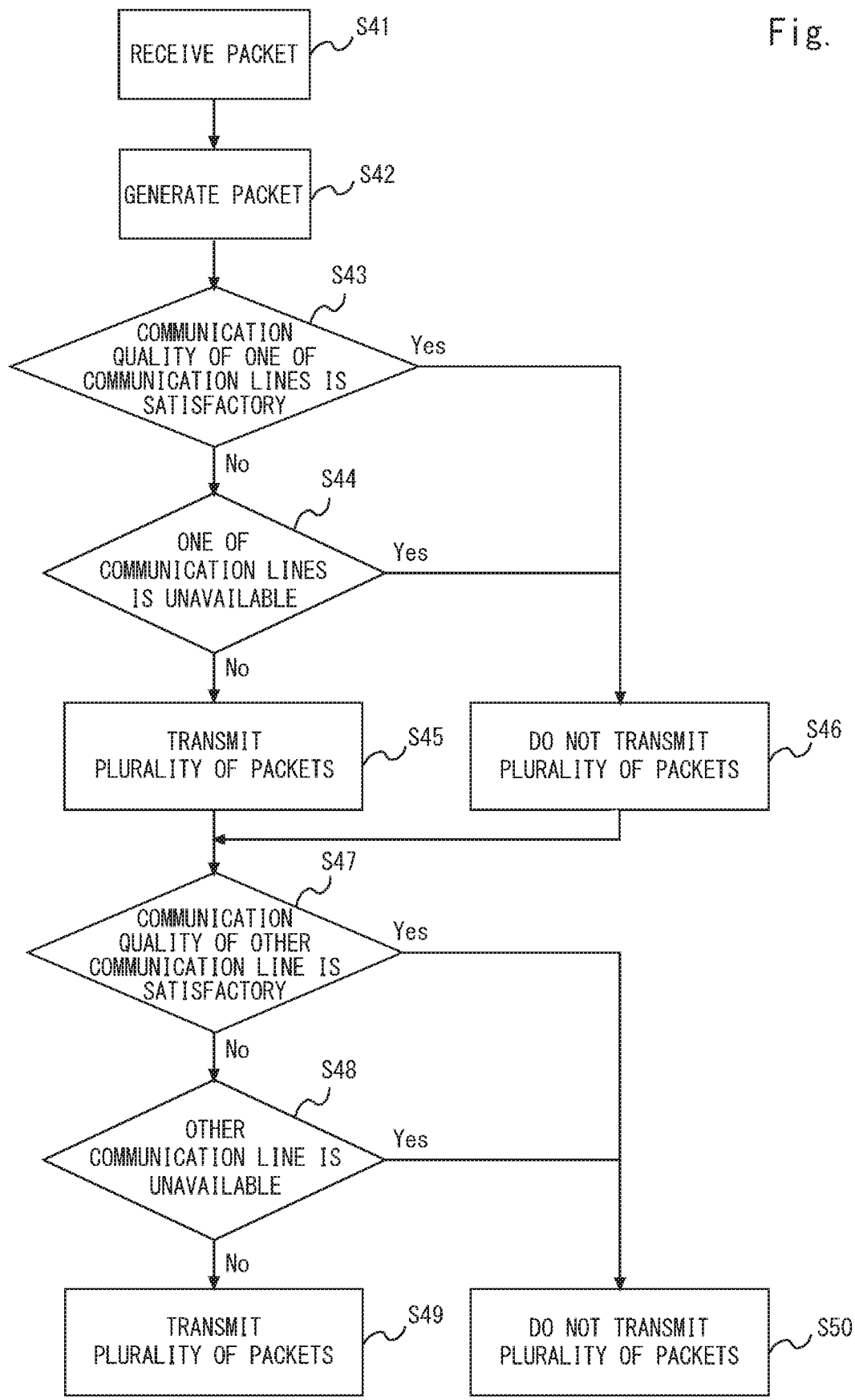
FIG. 8 shows a flow of packet transmitting processes in a transmitting apparatus according to a third embodiment.

Next, a flow of packet transmitting processes performed in a transmitting apparatus 44 according to a third embodiment of the present disclosure is described with reference to FIG. 8. Steps S41 and S42 are similar to the steps S11 and S12 in FIG. 4 and therefore their detailed descriptions are omitted.

Figure 9:
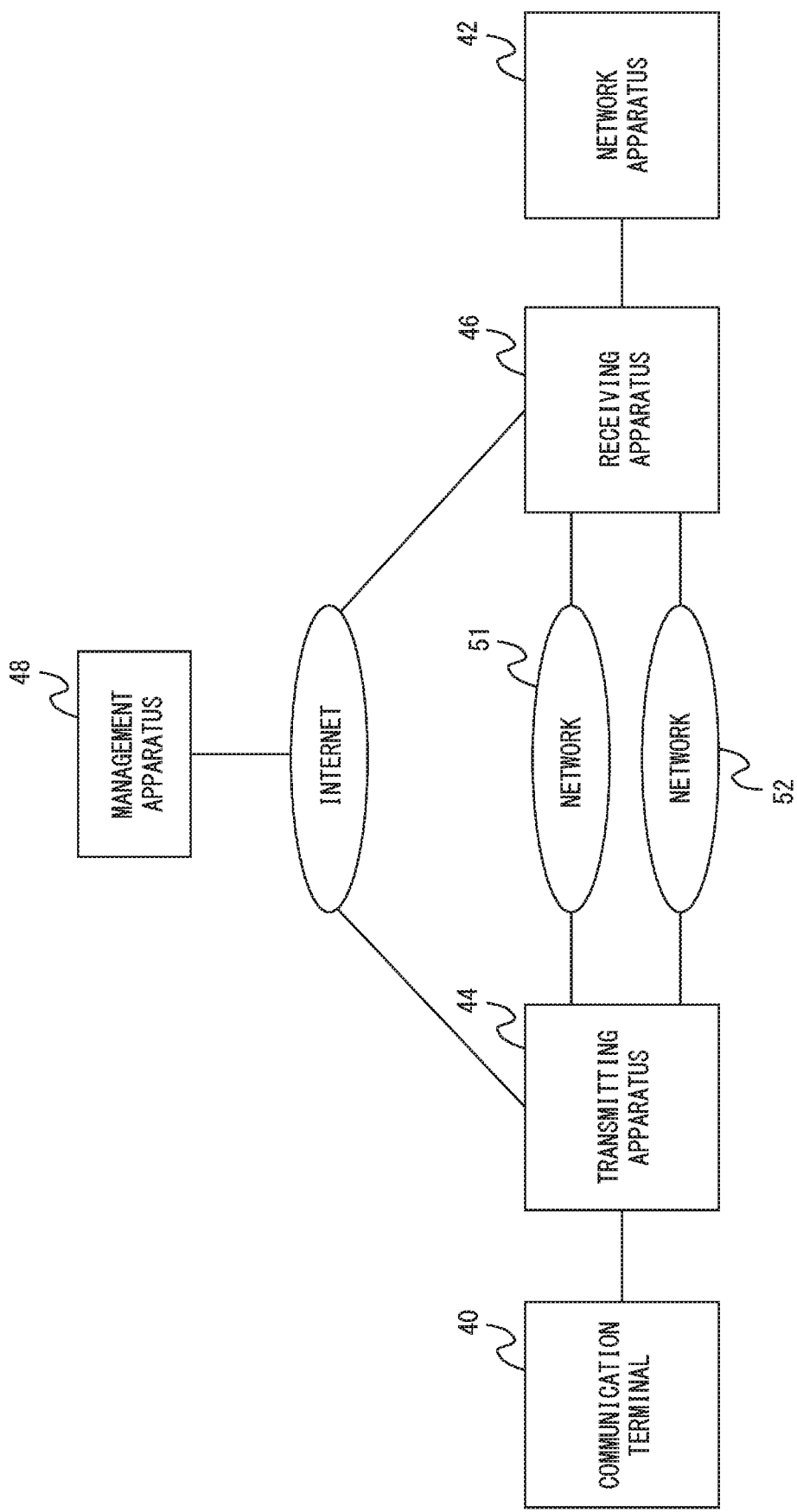
FIG. 9 is a configuration diagram of a communication system according to the third embodiment.

When a plurality of packets are generated in the step S42, the monitoring unit 15 determines whether or not communication quality of one of the communication lines is satisfactory (S43). For example, the monitoring unit 15 determines whether or not communication quality of the communication line through the network 51 is satisfactory. The monitoring unit 15 may acquire information about the communication quality of the communication line through the network 51 from the receiving apparatus 46. For example, the monitoring unit 15 may acquire information about the communication quality from the receiving apparatus 46 through the network 51. Alternatively, the monitoring unit 15 may acquire information about the communication quality from the receiving apparatus 46 through a network different from the network 51. The network different from the network 51 may be, for example, the Internet. Alternatively, as shown in FIG. 9, the monitoring unit 15 may acquire information about the communication quality from a management apparatus or the like that manages the communication system through the Internet. FIG. 9 shows a configuration in which a management apparatus 48 is connected to the transmitting apparatus 44 and the receiving apparatus 46 through the Internet. The communication system shown FIG. 9 has a configuration that is obtained by adding the management apparatus 48 in the communication system shown in FIG. 2.

The information about the communication quality of the communication line through the network 51 is, for example, a throughput, a packet loss rate, a transmission delay, etc. at the time when data is transmitted through the communication line in the network 51. For example, the monitoring unit 15 may determine that the communication quality of the communication line in the network 51 is not satisfactory when a throughput value received from the receiving apparatus 46 is lower than a threshold. Further, the monitoring unit 15 may determine that the communication quality of the communication line in the network 51 is not satisfactory when a value of the packet loss rate received from the receiving apparatus 46 is larger than a threshold.

When it is determined that the communication quality of the communication line in the network 51 is not satisfactory in the monitoring unit 15, the control unit 14 determines whether or not the communication line in the network 51 can be used (S44). The fact that the communication line in the network 51 cannot be used may be a state in which, for example, the throughput value received from the receiving apparatus 46 is lower than a threshold that is lower than the threshold used for the determination of the communication quality in the step S43. Alternatively, the fact that the communication line through the network 51 cannot be used may be a state in which, for example, the value of the packet loss rate received from the receiving apparatus 46 is larger than a threshold that is higher than the threshold used for the determination of the communication quality in the step S43.

When the control unit 14 determines that the communication line in the network 51 can be used, the control unit 14 transmits a plurality of packets to the receiving apparatus 46 through the transmitting unit 11 (S45). The control unit 14 may determine the number of packets to be transmitted according to a communication quality level of the communication line in the network 51. For example, the control unit 14 may transmit a larger number of packets to the receiving apparatus 46 through the transmitting unit 11 as the communication quality of the communication line in the network 51 deteriorates.

Further, when the control unit 14 transmits a plurality of packets to the receiving apparatus 46 through the transmitting unit 11, the control unit 14 may set a certain time period or longer as an interval between transmissions of packets. When intervals between transmissions of packets are short and a plurality of packets are transmitted substantially at the same timing, the plurality of packets are transmitted in a poor communication quality state. In contrast, by setting a certain time period or longer as an interval between transmissions of packets, it becomes possible to transmit packets in a satisfactory communication quality state. In particular, it has been known that communication quality of a wireless communication line changes in a short time. Therefore, by setting a certain time period or longer as an interval between transmissions of packets, the control unit 14 can transmit a plurality of packets at different timings at which communication qualities are different.

When it is determined that the communication quality of the communication line in the network 51 is satisfactory in the monitoring unit 15, or when the communication line in the network 51 cannot be used, the control unit 14 does not transmit a plurality of packets to the receiving apparatus 46 through the transmitting unit 11 (S46). Specifically, when it is determined that the communication quality of the communication line in the network 51 is satisfactory in the monitoring unit 15, the control unit 14 transmits one packet through the transmitting unit 11. When the communication line in the network 51 cannot be used, the control unit 14 does not transmit any packet through the transmitting unit 11.

Next, the monitoring unit 15 determines whether or not communication quality of a communication line different from the communication line for which the monitoring unit 15 has determined whether or not the communication quality is satisfactory in the step S43 is satisfactory (S47). That is, the monitoring unit 15 determines whether or not the communication quality of the communication line through the network 52 is satisfactory. Processes in steps S48 to S50 are similar to those in the steps S44 to S46 and therefore detailed descriptions thereof are omitted.

As described above, by performing the transmission process according to the third embodiment of the present disclosure, it is possible, when a communication line having low communication quality is used, to transmit a plurality of packets through that communication line. As described above, when a communication line having low communication quality is used, it is possible to increase the possibility that a packet reaches the receiving apparatus 46 by transmitting a plurality of packets. Meanwhile, when a communication line having high communication quality is used, it is unnecessary to transmit a plurality of packets through that communication line. Therefore, it is possible to maintain a high throughput because a plurality of packets are not transmitted in the communication line having high communication quality.

Fourth Embodiment

Next, a flow of transmission processes performed in a transmitting apparatus 44 according to a fourth embodiment of the present disclosure is described with reference to FIGS. 10 and 11. Steps S51 to S56 in FIG. 10 are similar to the steps S11 to S16 in FIG. 4 and therefore detailed descriptions thereof are omitted.

In a step S55, when the monitoring unit 15 determines that both communication lines are available, it performs processes in a step S57 and subsequent steps. Steps S57 to S62 are similar to steps S43, S45-S47, S49 and S50 in FIG. 8 and therefore detailed descriptions thereof are omitted. That is, in the process shown in FIG. 10, it is determined whether or not the communication line is unavailable. Therefore, unlike the flow shown in FIG. 8, the determination on whether or not the communication line is unavailable is not performed after the step S57 and after the step S60 in FIG. 11.

Figure 10:
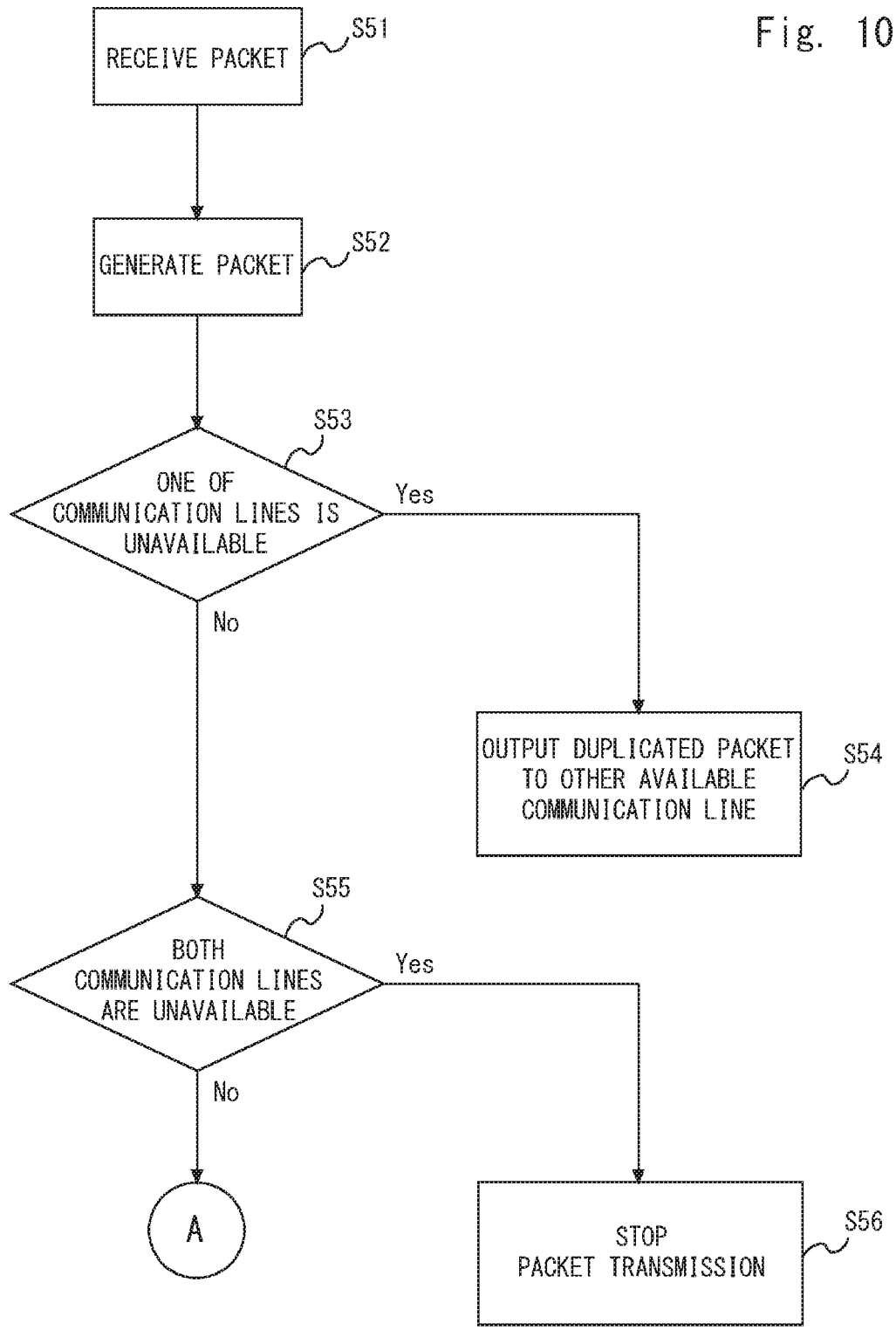
FIG. 10 shows a flow of packet transmitting processes in a transmitting apparatus according to a fourth embodiment.
Figure 11:
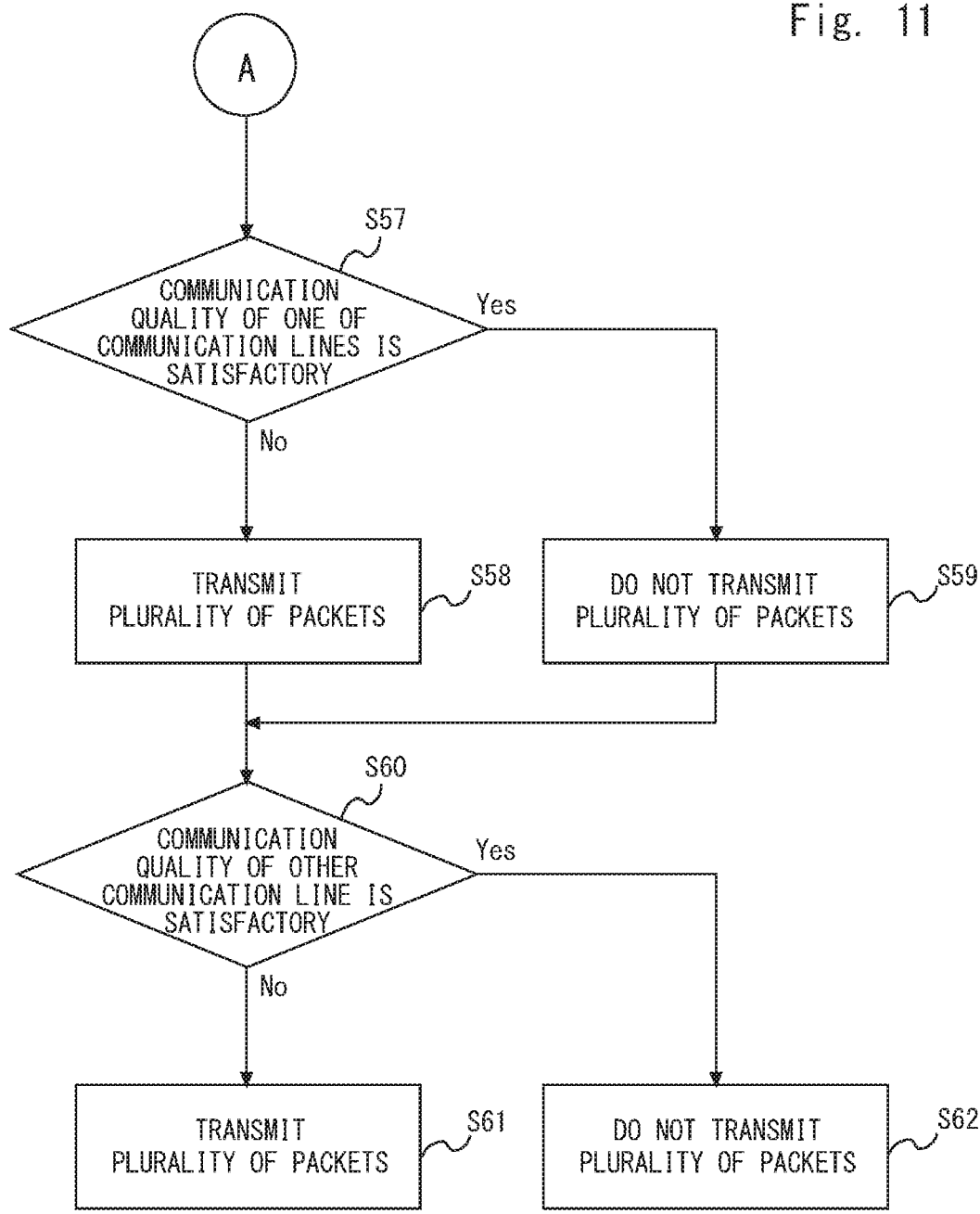
FIG. 11 shows a flow of packet transmitting processes in a transmitting apparatus according to the fourth embodiment.

By performing the transmission processes as shown in FIGS. 10 and 11, when the two communication lines can be communicated, the transmitting apparatus 44 can determine whether or not a plurality of packets should be transmitted through each of the two communication lines according to the communication quality of these communication lines. In this way, when the two communication lines can be communicated, it is possible to increase the possibility that the packet reaches the receiving apparatus 46 by transmitting the same packet to each of the communication lines. Further, it is possible to further increase the possibility that the packet reaches the receiving apparatus 46 by determining the communication quality of the two communication lines and outputting a plurality of packets to a communication line having lower communication quality.

Figure 12:
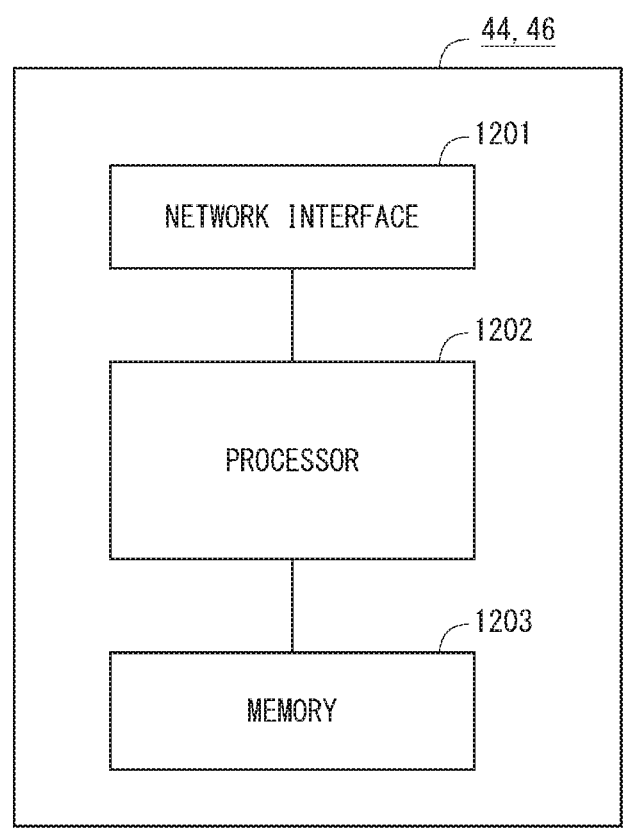
FIG. 12 is a configuration diagram of each of a transmitting apparatus and a receiving apparatus in each embodiment.

Next, a configuration example of each of the transmitting apparatus 44 and the receiving apparatus 46 explained in the above-described plurality of embodiments is explained hereinafter with reference to FIG. 12. FIG. 12 is a block diagram showing a configuration example of each of the transmitting apparatus 44 and the receiving apparatus 46. As shown in FIG. 12, each of the transmitting apparatus 44 and the receiving apparatus 46 includes a network interface 1201, a processor 1202, and a memory 1203. The network interface 1201 is used for communication with other network node apparatuses forming a communication system. The network interface 1201 may include, for example, a network interface card (NIC) in conformity with IEEE 802.3 series.

The processor 1202 performs processes performed by each of the transmitting apparatus 44 and the receiving apparatus 46 explained with reference to the flowcharts in the above-described embodiments by loading software (a computer program) from the memory 1203 and executing the loaded software. The processor 1202 may be, for example, a microprocessor, an MPU (Micro Processing Unit), or a CPU (Central Processing Unit). The processor 1202 may include a plurality of processors.

The memory 1203 is formed by a combination of a volatile memory and a nonvolatile memory. The memory 1203 may include a storage disposed apart from the processor 1202. In this case, the processor 1202 may access the memory 1203 through an I/O interface (not shown).

In the example shown in FIG. 12, the memory 1203 is used to store a group of software modules. The processor 1202 can perform processes performed by each of the transmitting apparatus 44 and the receiving apparatus 46 explained in the above-described embodiments by loading the group of software modules from the memory 1203 and executing the loaded software modules.

As explained above with reference to FIG. 12, each of the processors included in the transmitting apparatus 44 and the receiving apparatus 46 in the above-described embodiments executes one or a plurality of programs including a group of instructions to cause a computer to perform an algorithm explained above with reference to the drawings.

In the above-described examples, the program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

Note that the present disclosure is not limited to the above-described embodiments and can be modified as appropriate without departing from the spirit and scope of the present disclosure.

Although the present disclosure is explained above with reference to embodiments, the present disclosure is not limited to the above-described embodiments. Various modifications that can be understood by those skilled in the art can be made to the configuration and details of the present disclosure within the scope of the present disclosure.

The whole or part of the embodiments disclosed above can be described as, but not limited to, the following supplementary notes.

(Supplementary Note 1)

A communication apparatus comprising:

a first transmitting unit configured to transmit a packet to a communication apparatus at the other end through a first communication line;

a second transmitting unit configured to transmit a packet to the communication apparatus at the other end through a second communication line;

a packet generation unit configured to generate a plurality of packets by duplicating a packet;

a monitoring unit configured to monitor communication states of the first and second communication lines; and a control unit configured to determine to transmit two or more of the plurality of duplicated packets to the communication apparatus at the other end by using at least one of the first and second communication lines according to the communication states.

(Supplementary Note 2)

The communication apparatus disclosed in Supplementary note 1, wherein when the monitoring unit determines that a packet cannot be transmitted to the communication apparatus at the other end through the first communication line and a packet can be transmitted to the communication apparatus at the other end through the second communication line, the control unit determines that two or more of the plurality of packets generated in the packet generation unit should be transmitted from the second transmitting unit.

(Supplementary Note 3)

The communication apparatus disclosed in Supplementary note 1 or 2, wherein when it is determined that communication quality in the second communication line is lower than predetermined communication quality in the monitoring unit, the control unit determines that two or more of the plurality of packets generated in the packet generation unit should be transmitted from the second transmitting unit, and when it is determined that the communication quality in the second communication line is higher than the predetermined communication quality in the monitoring unit, the control unit determines that no redundant packet should be transmitted from the second transmitting unit.

(Supplementary Note 4)

The communication apparatus disclosed in any one of Supplementary notes 1 to 3, wherein when two or more packets are transmitted from the first or second transmitting unit or when two or more packets are transmitted from each of the first and second transmitting units, the control unit sets a period longer than a predetermined period as an interval between transmissions of packets.

(Supplementary Note 5)

The communication apparatus disclosed in any one of Supplementary notes 1 to 4, wherein when packets are transmitted by using the first and second communication lines, the control unit transmits a packet from the first transmitting unit and then, after a predetermined period has elapsed, transmits a packet from the second transmitting unit.

(Supplementary Note 6)

The communication apparatus disclosed in any one of Supplementary notes 1 to 5, wherein the first communication line is a communication line managed by a telecommunications carrier different from a telecommunications carrier managing the second communication line, a communication line using a wireless communication method different from a wireless communication method used for the second communication line, or a communication line using a frequency different from a frequency used for the second communication line.

(Supplementary Note 7)

The communication apparatus disclosed in any one of Supplementary notes 1 to 6, wherein the first communication line is a mobile network line including a wireless communication line and the second communication line is a wired communication line.

(Supplementary Note 8)

The communication apparatus disclosed in any one of Supplementary notes 1 to 6, wherein each of the first and second communication lines is a wired communication line.

(Supplementary Note 9)

The communication apparatus disclosed in any one of Supplementary notes 1 to 7, wherein the control unit assigns sequence numbers to packets transmitted from the first and second transmitting units, the sequence numbers indicating an order of the packets.

(Supplementary Note 10)

The communication apparatus disclosed in any one of Supplementary notes 1 to 9, wherein the control unit receives information about communication states of the first and second communication lines through the first and second communication lines.

(Supplementary Note 11)

The communication apparatus disclosed in any one of Supplementary notes 1 to 9, wherein the control unit receives information about communication states of the first and second communication lines from a management apparatus that manages the information about the communication states of the first and second communication lines.

(Supplementary Note 12)

A communication system comprising:

a transmitting apparatus configured to transmit two or more of a plurality of duplicated packets to a receiving apparatus by using at least one of first and second communication lines according to communication states of the first and second communication lines; and the receiving apparatus configured to delete a duplicate packet when the receiving apparatus receives the plurality of duplicated packets through at least one of the first and second communication lines.

(Supplementary Note 13)

A communication method comprising:

monitoring communication states of first and second communication lines;

generating a plurality of packets by duplicating a packet; and transmitting two or more of a plurality of duplicated packets to a communication apparatus at the other end through the first and second communication lines by using at least one of the first and second communication lines according to the communication states.

(Supplementary Note 14)

A program for causing a computer to perform:

monitoring communication states of first and second communication lines;

generating a plurality of packets by duplicating a packet; and transmitting two or more of a plurality of duplicated packets to a communication apparatus at the other end through the first and second communication lines by using at least one of the first and second communication lines according to the communication states.

REFERENCE SIGNS LIST

10 COMMUNICATION APPARATUS
11 TRANSMITTING UNIT
12 TRANSMITTING UNIT
13 PACKET GENERATION UNIT
14 CONTROL UNIT
15 MONITORING UNIT
20 COMMUNICATION APPARATUS
31 COMMUNICATION LINE
32 COMMUNICATION LINE
40 COMMUNICATION TERMINAL
42 NETWORK APPARATUS
44 TRANSMITTING APPARATUS
46 RECEIVING APPARATUS
48 MANAGEMENT APPARATUS
51 NETWORK
52 NETWORK
61 RECEIVING UNIT
71 RECEIVING UNIT
72 RECEIVING UNIT
73 CONTROL UNIT
74 TRANSMITTING UNIT

The invention claimed is:

1. A communication apparatus comprising:
at least one memory storing instructions, and
at least one processor configured to execute the instructions to:
transmit a packet to a second communication apparatus at the other end through a first communication line;
transmit a packet to the second communication apparatus at the other end through a second communication line;
generate a plurality of packets by duplicating a packet,
monitor communication, states of the first and second communication, lines; and
determine to transmit two or more of the plurality of duplicated packets to the communication apparatus at the other end by using at least one of the first and second communication lines according to communication states,
wherein
when it is determined that communication quality in the second communication line is lower than predetermined communication quality, the at least one processor is further configured to execute the instructions to determine that two or more of the plurality of packets should be transmitted through the second communication line, and
when it is determined that the communication quality in the second communication line is higher than the predetermined communication quality, the at least one processor is further configured to execute the instruction to determine that no redundant packet should be transmitted through the second communication line.

2. The communication apparatus according to claim 1, wherein
when determining that a packet cannot be transmitted to the communication apparatus at the other end through the first communication line and a packet can be transmitted to the communication apparatus at the other end through the second communication line,
the at least one processor is further configured to execute the instructions to determine that two or more of the plurality of packets should be transmitted through the second communication line.

3. The communication apparatus according to claim 1, wherein when two or more packets are transmitted the at least one processor is further configured to execute the instructions to set, a period longer than a predetermined period as an interval between transmissions of packets.

4. The communication apparatus according to claim 1, wherein when packets are transmitted by using the first and second communication lines, the at least one processor is further configured to execute the instructions to transmit a packet through the first communication line and then, after a predetermined period has elapsed, transmit a packet through the second communication line.

5. The communication apparatus according to claim 1, wherein the first communication line is a third communication line managed by a telecommunications carrier different from a telecommunications carrier managing the second communication line, a fourth communication line using a wireless communication method different from a wireless communication method used for the second communication line, or a fifth communication line using a frequency different from a frequency used for the second communication line.

6. The communication apparatus according to claim 1, wherein the first communication line is a mobile network line including a wireless communication line and the second communication line is a wired communication line.

7. The communication apparatus according to claim 1, wherein each of the first and second communication lines is a wired communication line.

8. The communication apparatus according to claim 1, wherein the at least one processor is further configured to execute the instructions to assign sequence numbers to packets transmitted through the first and second communication line, the sequence numbers indicating an order of the packets.

9. The communication apparatus according to claim 1, wherein the at least one processor is further configured to execute the instructions to receive information about communication states of the first and second communication lines through the first and second communication lines.

10. The communication apparatus according to claim 1, wherein the at least one processor is further configured to execute the instructions to receive information about communication states of the first and second communication lines from a management apparatus that manages the information about the communication states of the first and second communication lines.

11. A communication system comprising:
a transmitting apparatus configured to transmit two or more of a plurality of duplicated packets to a receiving apparatus by using at least one of first and second communication lines according to communication states of the first and second communication lines; and
the receiving apparatus configured to delete a duplicate packet when the receiving apparatus receives the plurality of duplicated packets through at least one of the first and second communication lines,
wherein,
when it is determined that communication quality in the second communication line is lower than predetermined communication quality, the transmitting apparatus is further configured to execute the instructions to determine that two or more of the plurality of packets should be transmitted through the second communication line, and
when it is determined that the communication quality in the second communication line is higher than the predetermined communication quality, the transmitting apparatus is further configured to execute the instruction to determine that no redundant packet should be transmitted through the second communication line.

12. A communication method comprising:

monitoring communication states of first and second communication lines;

generating a plurality of packets by duplicating a packet, and transmitting two or more of a plurality of duplicated packets to a communication apparatus at the other end through the first and second communication lines by using at least one of the first and second communication lines according to the communication states, wherein
- when it is determined that communication quality in the second communication line is lower than predetermined communication quality, determining that two or more of the plurality of packets should be transmitted through the second communication line, and
- when it is determined that the communication quality in the second communication line is higher than the predetermined communication quality, determining that no redundant packet should be transmitted through the second communication line.

* * * * *

UNITED STATES PATENT AND TRADEMARK OFFICE
CERTIFICATE OF CORRECTION

PATENT NO. : 10,666,502 B2  
APPLICATION NO. : 16/091580  
DATED : May 26, 2020  
INVENTOR(S) : Togo et al.

Page 1 of 1

It is certified that error appears in the above-identified patent and that said Letters Patent is hereby corrected as shown below:

In the Claims

Column 15, Line 34; In Claim 1, delete "packet," and insert --packet;-- therefor Column 15, Line 35; In Claim 1, delete "communication," and insert --communication-- therefor Column 15, Line 36; In Claim 1, delete "communication," and insert --communication-- therefor Column 15, Line 42; In Claim 1, delete "wherein" and insert --wherein:-- therefor Column 15, Line 54; In Claim 1, delete "instruction" and insert --instructions-- therefor Column 16, Line 4; In Claim 3, delete "set," and insert --set-- therefor Column 16, Line 58; In Claim 11, delete "wherein," and insert --wherein:-- therefor Column 17, Line 3; In Claim 11, delete "instruction" and insert --instructions-- therefor Column 17, Line 9; In Claim 12, delete "packet," and insert --packet;-- therefor Column 17, Line 16; In Claim 12, delete "wherein" and insert --wherein:-- therefor Signed and Sealed this  
Seventeenth Day of November, 2020

Andrei Iancu  
*Director of the United States Patent and Trademark Office*